(12) United States Patent
Chen et al.

(10) Patent No.: US 8,793,584 B2
(45) Date of Patent: Jul. 29, 2014

(54) CUSTOMIZABLE USER INTERFACE WRAPPERS FOR WEB APPLICATIONS

(75) Inventors: You B. Chen, Round Rock, TX (US);
Brian T. Lillie, Cedar Park, TX (US);
Richard Redpath, Cary, NC (US);
Daniel M. Schumacher, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 11/420,020

(22) Filed: May 24, 2006

(65) Prior Publication Data
US 2007/0277109 A1    Nov. 29, 2007

(51) Int. Cl.
*G06F 3/00* (2006.01)
*G06F 9/44* (2006.01)
*G06F 9/445* (2006.01)
*H04L 29/08* (2006.01)

(52) U.S. Cl.
CPC .............. *G06F 8/20* (2013.01); *G06F 9/44526* (2013.01); *H04L 67/02* (2013.01)
USPC ........... 715/733; 715/735; 715/746; 715/748; 709/231; 709/217

(58) Field of Classification Search
CPC ............................... G06F 8/20; G06F 9/44526
USPC ......... 715/231, 204, 239, 733, 735, 746, 748, 715/762, 763, 966; 709/231, 217, 227, 329
See application file for complete search history.

(56) References Cited

U.S. PATENT DOCUMENTS

| | | | |
|---|---|---|---|
| 5,940,395 A | 8/1999 | Fraenkel et al. | |
| 6,332,163 B1 * | 12/2001 | Bowman-Amuah | 709/231 |
| 6,438,594 B1 * | 8/2002 | Bowman-Amuah | 709/225 |
| 6,523,170 B1 | 2/2003 | Cuomo et al. | |
| 7,017,149 B2 * | 3/2006 | Hanis | 717/121 |
| 2003/0187988 A1 * | 10/2003 | Lee et al. | 709/227 |
| 2004/0003371 A1 * | 1/2004 | Coulthard et al. | 717/101 |

(Continued)

FOREIGN PATENT DOCUMENTS

CN    1696896 A    11/2005

OTHER PUBLICATIONS

Yang et al., The Eclipse Platform for Tool Integration and Development, Jan. 18, 2006 http://www.serc.net/report/tr273.pdf.*

(Continued)

*Primary Examiner* — Linh K Pham
(74) *Attorney, Agent, or Firm* — Brevetto Law Group

(57) ABSTRACT

Methods 300 and systems 400 are provided for creating customizable user interface wrappers for a web application using a software development platform with a plug-in architecture 100. The development platform is used to create one or more declarative descriptions in a predefined plug-in format which define the customized user interface. The declarative description is accessed to generate the user interface wrapper, and the web application is enabled to operate using the user interface wrapper. The declarative description may be in the form of an XML file implemented as an extension listed in an extension directory of a plug-in. The attributes specified in the declarative description may be tailored to run the web application on a given platform, such as an operating system implemented on a predefined type of computer.

18 Claims, 4 Drawing Sheets

(56) References Cited

U.S. PATENT DOCUMENTS

| | | | |
|---|---|---|---|
| 2004/0111400 A1* | 6/2004 | Chevalier | 707/3 |
| 2004/0199636 A1* | 10/2004 | Brown et al. | 709/227 |
| 2005/0008003 A1* | 1/2005 | Ramey et al. | 370/352 |
| 2005/0022115 A1* | 1/2005 | Baumgartner et al. | 715/513 |
| 2006/0015857 A1* | 1/2006 | Gold et al. | 717/139 |
| 2006/0029039 A1* | 2/2006 | Ramey et al. | 370/352 |
| 2006/0064422 A1* | 3/2006 | Arthurs et al. | 707/10 |
| 2006/0248121 A1* | 11/2006 | Cacenco et al. | 707/200 |
| 2006/0248145 A1* | 11/2006 | Karmakar et al. | 709/206 |
| 2006/0271869 A1* | 11/2006 | Thanu et al. | 715/764 |
| 2007/0088831 A1* | 4/2007 | Pallamreddy et al. | 709/227 |
| 2007/0185875 A1* | 8/2007 | Chang et al. | 707/9 |
| 2007/0192682 A1* | 8/2007 | Neil et al. | 715/513 |
| 2007/0209006 A1* | 9/2007 | Arthurs et al. | 715/733 |

OTHER PUBLICATIONS

Kimberly Horne, Addressing UI Scalability in Eclipse, Mar. 2, 2005, http://www.eclipsecon.org/2005/presentations/EclipseCon2005_7.1Scalability.pdf.*

Lu et al; A Middleware for legacy application wrapper; 2006; IEEE; 3 pages.*

* cited by examiner

```
<!-- the plug-in definition tag -->
<plugin
    id="com.somecompany.application.name"
    name="Test Application Plugin"
    version="1.0.0"
    provider-name="Some Company">

<runtime>
        <!-- the library containing the web application -->
        <library name="testapp.war"/>
    </runtime>

<!-- the extension point for a platform web application -->
    <extension point="com.ibm.platform.WebApplication">
        <!-- the properties used to customize the platform web application -->
        <DisplayName>Test Application</DisplayName>
        <Url>/TestApp</Url>
        <BrowserOptions addressbarVisible="false"
toolbarVisible="false"/>
        <Icon>icons/testapp.gif</Icon>
    </extension>
</plugin>
```

Fig. 2A

```
com.somecompany.application.name_1.0.0/
        plugin.xml
        testapp.war
        icons/
                testapp.gif
```

Fig. 2B

CUSTOMIZABLE USER INTERFACE WRAPPERS FOR WEB APPLICATIONS

BACKGROUND

1. Field

The present embodiments relate generally to computer applications, and more specifically to methods and systems for developing web applications for computers.

2. Background

A great deal of cost and effort goes into the development of new computer applications. Much of this effort is spent in writing and debugging computer code to give the software application the desired look and feel, controls and customized features. When new web applications are being developed they must have the ability to operate in conjunction with a conventional browser in order to traverse the Internet and read hypertext files. Conventional external browsers include, for example, Internet Explorer, Netscape Navigator, Firefox, Opera, Safari, Lynx, or the like.

One problem with using a conventional external browser in conjunction with a web application is that conventional browsers are typically not controllable or customizable within the particular platform being used to develop the web application to gain access the Internet. When a conventional browser is used in the development of a web application, the controls, functions and skin of the browser can be seen when the newly created web application product is launched. This is a drawback for web application developers, along with a lack of flexibility to customize conventional external browsers.

What is needed is to provision the ability to extend existing web applications and present them within the development platform, without the need for an external browser or construction of coded plug-in method infrastructure. This would allow for some level of customization by the web application provider.

SUMMARY

Embodiments disclosed herein address the above stated needs by providing systems and methods for creating customizable user interface wrappers for a web application, including creating a declarative description of the customized user interface and storing it in the memory of a computer, accessing the declarative description to generate the user interface wrapper; and then enabling the web application to operate using the user interface wrapper.

In at least one exemplary embodiment the declarative description is stored in an XML file in order to provide attributes for operating the web application. The XML file may be implemented as an extension listed in an extension directory of a plug-in. The attributes may be tailored to run the web application on a given platform, such as an operating system implemented on a predefined type of computer.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 2A depicts an exemplary plug-in embodied in Java;

FIG. 2B depicts an exemplary file structure of a plug-in containing two files;

DETAILED DESCRIPTION

Figure 1:
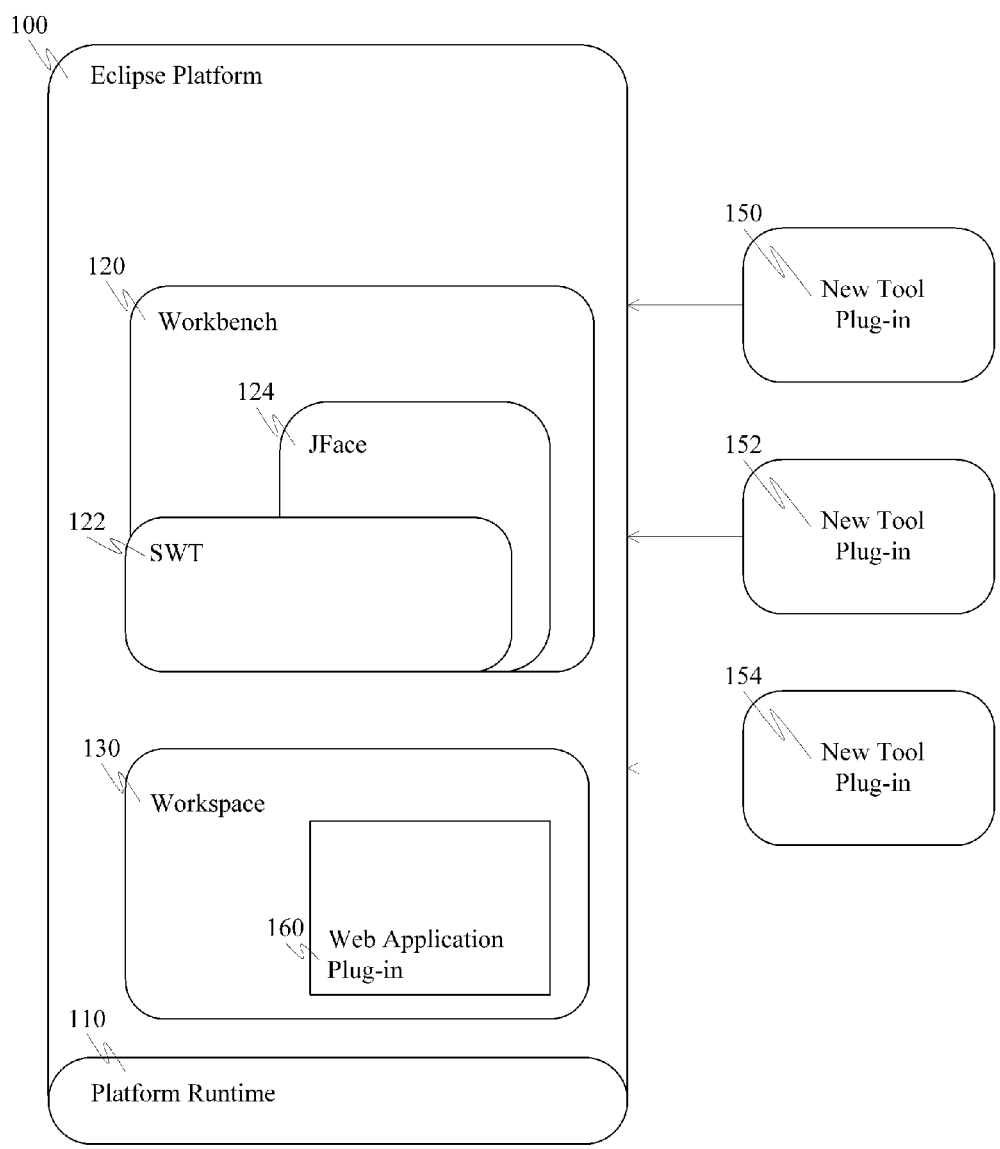
FIG. 1 depicts a software development platform architecture for implementing the various embodiments.

The following description of the various exemplary embodiments is illustrative in nature and is not intended to limit the invention, its application, or uses.

Various embodiments may be implemented in a software development platform with a plug-in architecture. Eclipse is one software development platform which may be used. Wrapping a web application allows the software developer (or programmer) to modify the web application to run on one or more software platforms. A web application is a software application or routine that submits data, for example, in response to a user action or input, over a network and gets a response. In accordance with some embodiments, a web application may be distinguished from a standard application by the number of views in the perspective. A perspective is what is being displayed at a given time on the screen of a computer with a graphical user interface (GUI) based operating system (OS). A perspective may include a number of different overlapping panes (or windows) from different applications. A view is a single pane. Standard applications may have multiple views displayed simultaneously on a computer screen. However, in some embodiments, a web application has only one view associated with it, and thus may be distinguished from a standard application by the number of views associated with it. In other embodiments, however, a web application may be associated with more than one view.

Typically, web applications do not have natively dependent code. That is, web applications are not generally tied to any particular platform of the many platforms currently available such as the Windows® Millenium Edition, Windows® XP, Linux, or the like. As such, however, a conventional web application is not tailored or customized for different platforms, or for any platform in particular. As part of wrapping the web application, declarative properties are added and the web application is repackaged. This allows the web application to run in a desired manner on a given platform, giving the wrapped web application a custom control or canvas for that platform. Further, the wrapped web application may include a user interface (UI) tailored to an operating system implemented on a predefined type of computer, e.g., a desktop computer, a laptop, a server, a personal digital assistant (PDA), or other like type of computer or information handling device.

The control may be configured to have a UI consistent with the rest of the platform. The customization is achieved through the declaration procedure. By repackaging an existing binary application, the wrapped web application may be configured to run on multiple software platforms, without necessarily requiring a recompilation of the web application code for each software platform. Since the customization is performed on an existing binary web application, the web application includes code for a UI at the beginning of the customization process. As part of the wrapping of the web application, it is associated with new customized UI code which is configured to display a view of the web application on the computer which stores and launches the new customized UI code.

A declarative file, such as an XML file, may be used to provide attributes for running the web application within a given platform. Typically, this is done by extending a provided function of the platform. The web application developer packages the web application binary code along with a declarative file in a form that the platform can recognize, generally without having to write or compile additional code. The wrapped web application can be installed into the platform in a form that gels with the platform, providing immediate access to the application. Additional levels of customization may be provided, if allowed by the platform.

The platform typically provides the ability to interpret the declarative information and generate a customized UI wrapper for the web application. Generally a browser control is generated and pointed to the web application's context root. The context root is typically defined as the web application root, which is the top-level directory of the application when it is deployed to a web server. For example, if I have an application with a context root of "TestApp" is running on a web server with an address of http://192.168.10.10 then the way to access it would be to go to <server address>/<context root>—http://192.168.10.10/TestApp. Further look-and-feel functions may be added as well using extensions. An extension point causes a perspective and view to be created upon being extended. An extension is created by placing one or more plug-ins in an extension directory. A plug-in typically references the platform extension point in the plug-in descriptor and provides any configuration information required by the extension point. In Eclipse the extension directory contains plug-ins to be linked, but does not contain the Java Runtime Environment (JRE) or the Eclipse engine. Using an extension point to link plug-ins permits the linked plug-ins to be registered and used when the application is launched.

The Eclipse view used by developers contains a Standard Widget Toolkit (SWT) browser control that may be directed to the location provided by the extending application. A web application developer packages the web application as a plug-in, providing a plug-in manifest that extends the platform's web application extension point and also provides the context root of the web application, and optionally provides icons and displayable text. When registering this plug-in, the platform loads and runs the web application and then can generate a customized UI wrapper for the web application. This is all done without the application developer necessarily having to write or compile additional code, which would typically be required if conventional development of a dedicated perspective and view were used for a web application.

FIG. 1 depicts a software development platform architecture 100 which may be used to implement various embodiments. The platform architecture in this exemplary embodiment is Eclipse, an open integrated development environment (IDE) which may be used, for example, by a software developer or programmer to develop web applications. The Eclipse development platform architecture is used herein to illustrate and explain various embodiments, and not by way of limitation. The various embodiments may be implemented using a number of other development platforms, for example, IBM's WebSphere Studio Application Developer or Rational Application Developer, Borland's JBuilder, or BEA WebLogic Workshop, Oracle's JDeveloper and NetBeans, or other like types of development platforms. Eclipse may be used to build or modify web applications by formatting them as plug-ins 160. The Eclipse platform 100 itself consists of a number of components, including platform runtime 110, workspace 130 and workbench 120. The workbench 120 is used for graphical user interface (GUI) based applications, and may, in some instances, be omitted for non-GUI configurations of the Eclipse platform 100. Although the plug-in 160 is depicted within the workspace 130 and referred to herein as a plug-in, the plug-in 160 remains, in a strict sense, a plug-in project until completion since it is not really a plug-in until the project is built.

A plug-in 160 may be in the form of a directory structure containing one or more files, e.g., a manifest, compiled libraries, translated messages, etc. The manifest file of a plug-in (e.g., plugin.xml) defines information about the plug-in 160, declares the interconnection between that plug-in and other plug-ins, and can reference libraries of compiled source code to be executed within Eclipse. The compiled source code to be executed may be a web application, for example. Typically, plug-ins 160 have characteristics which are declaratively specified in the manifest file. The declarative plug-in characteristics may be used to customize the attributes of the application containing the plug-in. A plug-in 160 may be formed from separate fragments which each have a dedicated directory or URL. A plug-in may be packaged up into a .jar file (Java Archive) for easier delivery.

Plug-in tools 150-54 can be developed to perform a specified functionality on an application program. A simple tool with a straightforward functionality may be written as a single plug-in. More complex tools may be created with functionality split across multiple plug-ins. Many of the diverse functionalities of Eclipse platform 100 are located in the platform's plug-in tools 150-54. Eclipse plug-in tools 150-54 may include Java code from a JAR library, native code libraries, web templates, read-only files, images, HTML files (hypertext markup language), or the like. The code library and read-only content of plug-in tools 150-54 are typically located in a directory within the file system or else at a specified URL. The platform runtime 110 detects and logs plug-in tools 150-54 as part of the start-up process. The platform runtime 110 discovers the available plug-in tools 150-54 at start-up, reads the manifest files of the plug-ins 150, matches extension declarations with corresponding extension point declarations, builds a plug-in registry in the computer's memory, and logs any missing extension points. Typically, no further plug-in tools 150-54 will be added once the platform runtime 110 has completed logging the plug-ins as part of the start-up process.

The workbench 120 serves as the UI of the Eclipse Platform, providing a useful structure for constructing or modifying a plug-in 160. Workbench 120 includes the Standard Widget Toolkit (SWT) 122 and the JFace toolkit 124. SWT 122 is a widget set and graphics library used to present information to the user. SWT 122 provides users with an application program interface (API) which is OS-independent. JFace 124 is a specialized toolkit useful for programming UI tasks. JFace 124 includes UI toolkit components such as image and font registries, dialog, preference, and wizard frameworks, and progress reporting for long running operations.

The Eclipse development platform is discussed in further detail in the "Eclipse Platform Technical Overview" (c) (published July, 2001 by Object Technology International, Inc.; posted at wwww.eclipse.org.whitepapers/eclipse-overview.pdf) and the book entitled "Eclipse: Building Commercial Quality Plug-ins," by Eric Clayberg and Dan Rubel (Addison-Wesley Professional June, 2004), both of which are hereby incorporated by reference herein in their respective entireties.

FIG. 2A depicts an example of code for a plugin.xml manifest file written in XML. The plug-in includes declarative statements that customize various aspects of the application, for example, id="com.somecompany.application.name", name="Test Application Plugin", version="1.0.0", and provider-name="Some Company".

The plug-in manifest shown in the figure, plugin.xml, includes an extension for a web application extension point="com.ibm.platform.WebApplication". This extension lists out some properties that customize some of the aspects of the application, for example, <DisplayName>Test Application</DisplayName>; <Url>/TestApp </Url>; <BrowserOptions addressbarVisible="false toolbarVisible="false"/>; and <Icon> icons/testapp.gif</Icon>. The extension may be thought of as a hook into the platform, in a manner of speaking. The manifest file of each plug-in declares the interconnections from that plug-in to any other interconnected plug-ins by declaring extensions to extension points located in one or more other plug-ins.

FIG. 2B depicts an exemplary file structure of a plug-in containing two files. The plug-in file structure shown in the figure contains the plug-in XML file "plugin.xml" and a web application file "testapp.war." The file "plugin.xml" may be an XML plug-in file such as that depicted in FIG. 2A. A web application which has been wrapped in a development platform such as Eclipse may have a file structure similar to that of the plug-in shown in FIG. 2B containing two or more files.

Figure 3:
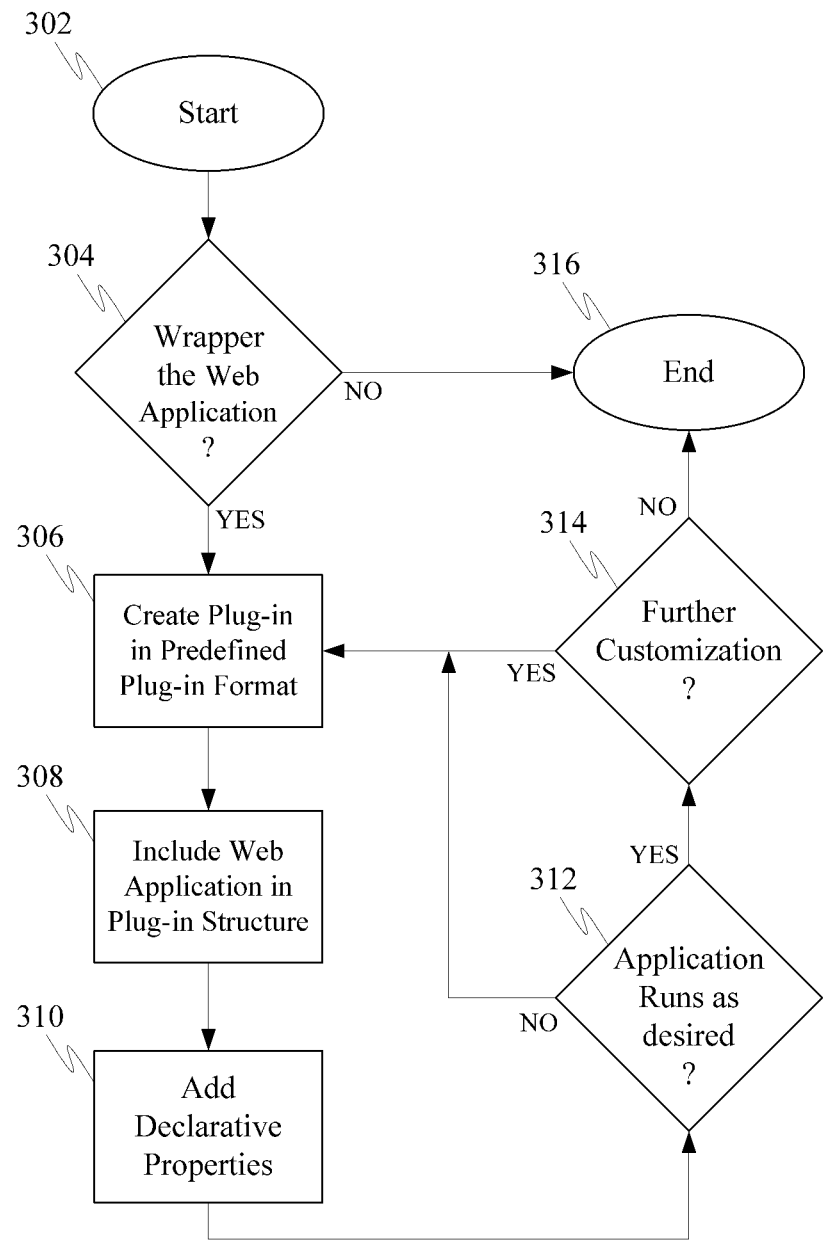
FIG. 3 depicts a method of wrapping a web application according to various embodiments.

FIG. 3 depicts a method 300 of wrappering a web application according to various embodiments. An example of a web application being wrappered could occur with the creation banking software which runs on a bank's kiosk ATM (automated teller machine). The bank's web application running on its website may contain many of the features desired for its ATM kiosk web application. For example, a user could access the bank's website using a browser, enter the user password, and then perform various transactions such as checking account balances, transferring funds, etc. However, when the bank's website is accessed with a browser, the skin of the browser with the various browser controls and buttons are visible and available to the user. This would be undesirable for the ATM kiosk web application. The various embodiments disclosed herein allow a software developer or programmer to modify a copy of the bank's web application running on its website, transforming it into a customized version of the web application for use in the ATM kiosk. The developer could start with the bank's website web application and wrapper this platform to customize it with any desired look and feel, features, menu items, or controls. Developing the ATM kiosk web application in this manner, in accordance with various embodiments, would save a great deal of time and yet produce a customized product without the browser's skin or generic browser controls. FIG. 3 illustrates a method for wrappering a web application in this manner.

A developer typically starts with an existing web application which may be accessed on the Internet using a browser. The web application may be a generic web application, for example, written in Java, which is not native to any particular software platform. The method begins in 302 and proceeds to 304 where it is determined whether the web application is to be wrappered or not. If not, the method proceeds along the "NO" branch to 316 and ends. However, if it is decided, in 304, that the web application is to be wrappered the method proceeds from 304 along the "YES" branch to 306.

In 306 a plug-in is created in a predefined plug-in format. The notion of having a plug-in to a platform implies that there is a platform-defined structure that the plug-in adheres to so that the platform can successfully recognize and access the plug-in. In 306 the "predefined plug-in format" is the platform-defined structure that allows the platform to recognize and access the plug-in. For example, if Eclipse is being used in 306 to modify a web application as a plug-in, then the plug-in being developed must adhere to the Eclipse predefined plug-in format—that is, Eclipse's mechanisms and rules for plug-ins.

Upon completing 306 the method proceeds to 308 to include the web application in the structure. The structure of this plug-in typically includes two or more files (e.g., at least one file such as a plugin.xml file with declarative statements, and the web application file). FIG. 2B depicts an exemplary plug-in structure with the web application contained in the plug-in. Once the web application is included in the plug-in structure the method proceeds to 310 to add declarative properties to the plug-in.

The declarative statements may specify the look and feel for the customized web application, one or more URLs (universal resource locators) to be accessed locally or over a network by the customized web application, specialized menu lists, buttons or controls, the color scheme, line widths and shading, and any other custom features for the UI of the customized web application as it appears in the platform. Other features which may be specified as declarative statements include, for example: Toggling the visibility of the address bar (which displays the URL to the application); Providing a path to an image to be associated with the application in the platform (i.e. a "launch icon" for the app); or Indicating how the platform should "launch" the application (e.g., launched in the general "application" area of the platform or possibly in a separate window to be solely used by the application, and therefore resizable, expandable, etc. by itself without affecting any other running applications in the platform). This may be done by adding declarative properties to the plug-in descriptor via a platform extension. Declarative statements may be used to specify extensions to any number of extension points in other plug-ins. The extension points of one plug-in may be extended through another plug-in by defining an extension to the extension point in the other plug-in. Extension points define new function points for the platform that other plug-ins can plug into. Extension points may be better understood by the analogy of a power outlet to an appliance that plugs into the outlet can be used to describe the function of extension points (outlet) to extensions (appliance). Once the desired declarative properties have been added in 310 the method proceeds to 312.

In block 312 it is determined whether or not the application runs in the manner desired by the user. At this point, the customized web application should operate to access the defined URL without showing the standard browser skin or browser controls. The customized web application will have a tailored look and feel, including its own custom menu items and controls. If the errors are discovered in the web application, the application is unstable or contains bugs, or the application does not otherwise operate in the desired manner, the method proceeds from 312 along the "NO" branch back to 306. In 306 the user may again create a plug-in in the predefined plug-in format, or simply modify the previously created plug-in to fix the errors detected in the application in 312. Back in 312, if it is determined that the application is stable and runs as expected the method proceeds from 312 along the "YES" branch to 314.

In 314 the user determines whether the look-and-feel or controls of the web application are acceptable, or any additional features are desired for the web application. If, in 314, it is determined that further customization is warranted the method proceeds from 314 along the "YES" branch back to 306. The user may create a new plug-in in 306, or modify the previously created plug-in, to effect the changes desired by the user for further customization of the application. If no further customization is desired in 314 the method proceeds from 314 to 316 and ends. Once the method has been completed, creating a customized user interface wrapper for the web application, the newly wrapped web application may be stored in the memory of a computer. When the wrapped web application is launch, it can access data or perform operations via the Internet in a predefined manner without showing the browser controls, menus or skin.

Figure 4:
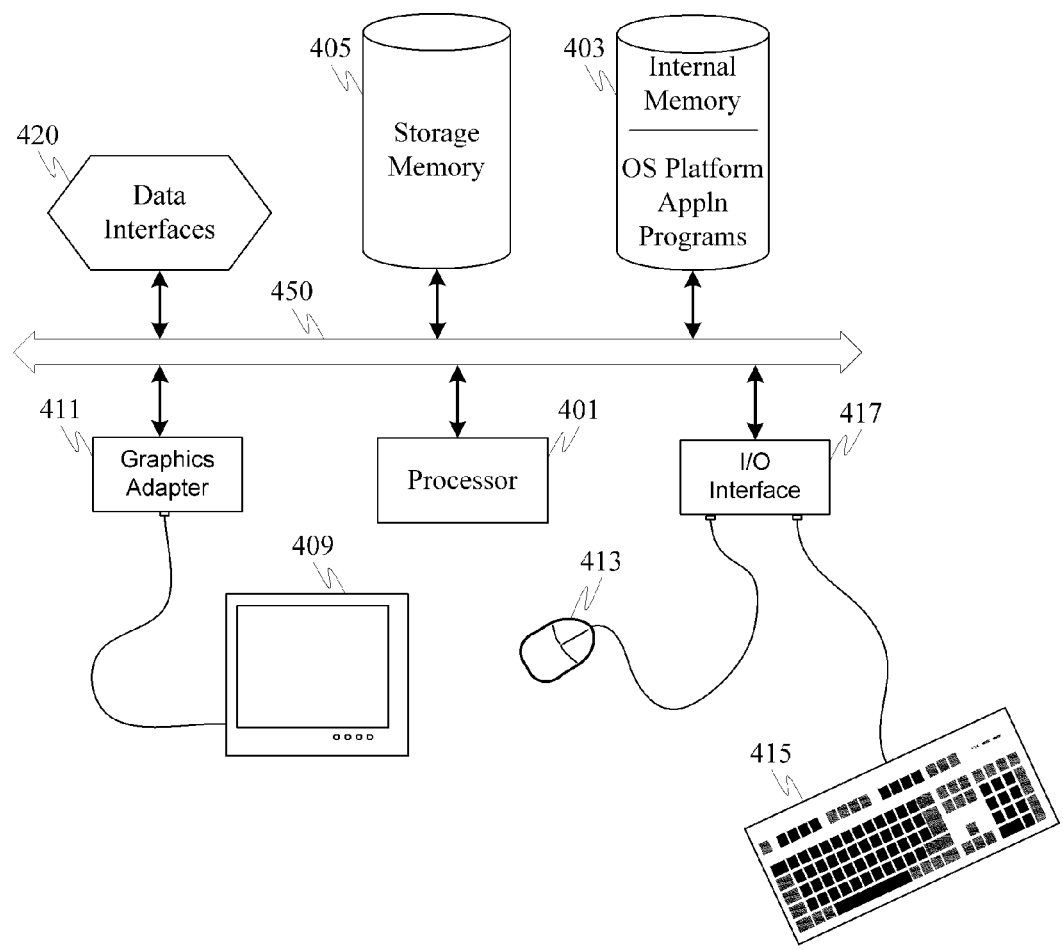
FIG. 4 depicts an exemplary hardware environment for implementing the various embodiments.

FIG. 4 depicts an exemplary hardware environment for implementing the various embodiments. The figure shows a block diagram of a typical information handling system hardware configuration which includes processor 401. The processor 401 may be implemented as a central processing unit (CPU) containing circuitry or other logic capable of performing or controlling the processes, steps and activities involved in practicing the embodiments disclosed herein. The processor 401 may be embodied as either a microprocessor or an application specific integrated circuit (ASIC), may be a combination of two or more distributed processors, or any other circuitry or logic capable of carrying out commands or instructions, for example, the routines of a computer program such as a web application. In various embodiments the processor 401 may run a computer program or routine which performs one or more of the activities depicted in FIG. 3.

The processor 401 is interconnected to internal memory 403 and storage memory 405. The components of system 400 are typically interconnected via a bus 450. One or more of the components may be connected via an I/O bus (input/output bus), direct serial or parallel wired connections, wireless links, or a combination of any of these. The internal memory 403, which may be referred to as a local memory, may be any of several types of storage devices used for storing computer programs, routines, or code, including the instructions and data for carrying out activities of the various embodiments such as the activities discussed herein.

The internal memory 403 and storage memory 405 may be implemented in any form suitable for storing data in a computer system, for example, as random access memory (RAM), read only memory (ROM), flash memory, registers, hard disk, or removable media such as a magnetic or optical disk, or other storage medium known in the art. Either of the memories 403 and 405 may include a combination of one or more of these or other such storage devices or technologies. A wrapped web application may be stored in storage memory 405 of the computer system 400. The internal memory 403 and storage memory 405 may each be configured to store all or parts of a computer program product which performs the various activities in creating a customized wrapper for a web application.

The processor 401 is configured to communicate with internal memory 403 and storage memory 405 via the bus 450 or by way of other wired or wireless communication links. Although the bus 450 is depicted as a single bus connecting all of the component parts of the system, the information handling system 400 may include two or more separate buses each connected to a subset of the system components.

The information handling system 400 also includes one or more input/output (I/O) units such as user output 409 and user inputs 413 and 415. The user output 409 may be interfaced to bus 450 by a graphics adapter and implemented as a monitor, for example, a cathode ray tube (CRT) or a liquid crystal display (LCD) screen or other like type of computer screen. Typically, the output 409 (e.g., computer screen) displays a view controlled by the wrapped web application stored in memory 405 in response to the application being executed by processor 401 of the computer 400. The user output 409 may include one or more audio speakers as well as a video monitor. The information handling system 400 typically includes one or more user input devices 413-15 such as a keyboard, a mouse, a tablet surface and pen, a microphone and speech recognition routine, or other like types of input/output devices. The user input devices 413-15 may be interfaced to bus 450 by an I/O interface 417. The user output 409 and user inputs 413 may include other devices known to those of ordinary skill in the art and suitable for use with a computer system.

The information handling system 400 is configured to include data interface unit 420 suitable for connecting to networks such as one or more of the Internet, a local area network (LAN), a wide area network (WAN), the Public Switched Telephone System (PSTN), or to a wireless telephone network. The data interface unit 420 may include a wired and/or wireless transmitter and receiver. The data interface unit 420 may be implemented in the form of multiple units, including, for example, a modem and a network adapter. When the processor 401 executes the wrapped web application stored in memory 405, the computer system 400 accesses the Internet data interface unit 420 and functions in a predefined manner specified by the declarative statements in the wrapped web application. The information handling system 400 may use data interface unit 420 to connect to a server configured to store a computer program product such as the Eclipse platform which performs the various activities for creating a customized wrapper for a web application.

Various steps may be included or excluded as described herein, or performed in a different order, with the rest of the activities still remaining within the scope of at least one exemplary embodiment. For example, in at least one exemplary embodiment, if it is determined in 312 that the wrappered web application does not run in the manner desired, the method may loop back to 310 to change the declarative properties rather than looping back to 306 to begin the process again. Other deviations from the order depicted in the figures may fall within the scope of this disclosure, and some activities may be performed in an order other than that shown in the figures. For example, blocks 314 may be performed before block 312. It is expected that those of ordinary skill in the art may perform would know to change the order of the activities in other manners as well.

The processing units, processors and controllers described herein (e.g., processor 401 of FIG. 4) may be of any type capable of performing the stated functions and activities. For example, a processor may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium, e.g. hard disk, CD, flash memory, ram, or other computer readable medium as recognized by one of ordinary skill in the art. The computer software programs can aid or perform the steps and activities described above. For example computer programs in accordance with at least one exemplary embodiment may include source code for storing a declarative description of a customized user interface in a storage medium, for accessing the declarative description to generate the user interface wrapper, and for enabling the web application to operate using the user interface wrapper. There are many further source codes that may be written to perform the stated steps and procedures described herein, and these are intended to lie within the scope of exemplary embodiments.

The use of the word "exemplary" in this disclosure is intended to mean that the embodiment or element so described serves as an example, instance, or illustration, and is not necessarily to be construed as preferred or advantageous over other embodiments or elements. The term "web application", as used herein, is intended to mean any software application or routine that submits data (e.g., in response to a user action or input) over the Internet and gets a response. The terms "platform" and "software platform" have been used interchangeably in this disclosure and are intended to mean an operating system which runs on a computing device or other state machine. As such, a "platform" may include software, routines, programs, commands or the like, but typically does not include hardware. A "development platform", as used herein, is intended to mean a type of software or a software environment which may be used to modify or create software applications such as web applications. The description of the invention provided herein is merely exemplary in nature, and thus, variations that do not depart from the gist of the invention are intended to be within the scope of the embodiments of the present invention. Such variations are not to be regarded as a departure from the spirit and scope of the present invention.

What is claimed is:

1. A computer-implemented method for creating a customized wrapper for a web application, the method comprising:
    storing a declarative description of the web application in a storage medium;
    accessing said declarative description;
    generating a user interface for the customized wrapper based upon said declarative description, said user interface being configured with controls for accessing and operating the web application, wherein the customized wrapper includes at least one declarative statement based upon the declarative description of the web application;
    enabling the web application to operate using the customized wrapper comprising said user interface; and
    storing the web application and the user interface in a storage memory of a computer;
    wherein the customized wrapper is configured to, upon being launched, cause the user interface to display a view associated with the web application on a screen of the computer, said view associated with the web application being the only view displayed on the screen of the computer; and
    wherein the web application is configured to be launched from the computer to access Internet data in a predefined manner without using a browser, said predefined manner being defined by the at least one declarative statement which specifies one or more universal resource locators (URLs) that the web application is authorized to access.

2. The method of claim 1, wherein the web application is a preexisting web application and is enabled to operate using the user interface without modification of the preexisting web application.

3. The method of claim 1, wherein the declarative description is in an XML file.

4. The method of claim 3, wherein the XML file is accessed as an extension listed in an extension directory.

5. The method of claim 1, wherein the declarative description provides attributes for running the web application on a given platform.

6. The method of claim 5, wherein the platform is an operating system.

7. The method of claim 1, wherein the computer-implemented method is performed on a software development platform with a plug-in architecture.

8. The method of claim 1, wherein the software development platform is Eclipse.

9. The method of claim 1, wherein the user interface displays only one view at a time while it is running.

10. The method of claim 1, wherein the declarative description is stored in a predefined plug-in format.

11. A computer program product comprising a non-transitory computer usable storage medium including computer usable code for creating a customized wrapper for a web application, said computer program product including:
    computer usable program code for storing a declarative description of the web application in a storage medium;
    computer usable program code for accessing said declarative description;
    computer usable program code for generating a user interface for the customized wrapper based upon said declarative description, said user interface being configured with controls for accessing and operating the web application, wherein the customized wrapper includes at least one declarative statement based upon the declarative description of the web application;
    computer usable program code for enabling the web application to operate using the customized wrapper comprising said user interface; and
    computer usable program code for storing the web application and the user interface in a storage memory of a computer;
    wherein the customized wrapper is configured to, upon being launched, cause the user interface to display a view associated with the web application on a screen of the computer, said view associated with the web application being the only view displayed on the screen of the computer; and
    wherein the web application is configured to be launched from the computer to access Internet data in a predefined manner without using a browser, said predefined manner being defined by the at least one declarative statement which specifies one or more universal resource locators (URLs) that the web application is authorized to access.

12. The method of claim 11, wherein the web application is a preexisting web application and is enabled to operate using the user interface without modification of the preexisting web application.

13. The computer program product of claim 11, wherein the declarative description is in an XML file accessed as an extension listed in an extension directory.

14. The computer program product of claim 11, wherein the declarative description provides attributes for running the web application on a given platform.

15. The computer program product of claim 14, wherein the platform is an operating system.

16. The computer program product of claim 11, wherein the user interface displays only one view at a time while it is running.

17. The computer program product of claim 11, wherein the declarative description is stored in a predefined plug-in format.

18. An information handling system configured to create a customized wrapper for a web application configured to be launched from a computer, the information handling system comprising:
    one or more storage memories configured to store the web application and a declarative description of the web application;
    a data interface configured to access the declarative description for generating a user interface for the customized wrapper based upon said declarative description, said user interface being configured with controls for accessing and operating the web application, wherein the customized wrapper includes at least one declarative statement based upon the declarative description of the web application;

a processor configured to enable the web application to operate using the customized wrapper comprising said user interface; and a computer screen configured to display a view associated with the web application in response to the customized wrapper being launched on the information handling system, wherein the customized wrapper is configured to, upon being launched, cause the user interface to display a view associated with the web application on the computer screen, said view associated with the web application being the only view displayed on the screen of the computer;

wherein the web application is configured to be launched from the computer to access Internet data in a predefined manner without using a browser, said predefined manner being defined by the at least one declarative statement which specifies one or more universal resource locators (URLs) that the web application is authorized to access.

\* \* \* \* \*